Figure 1:
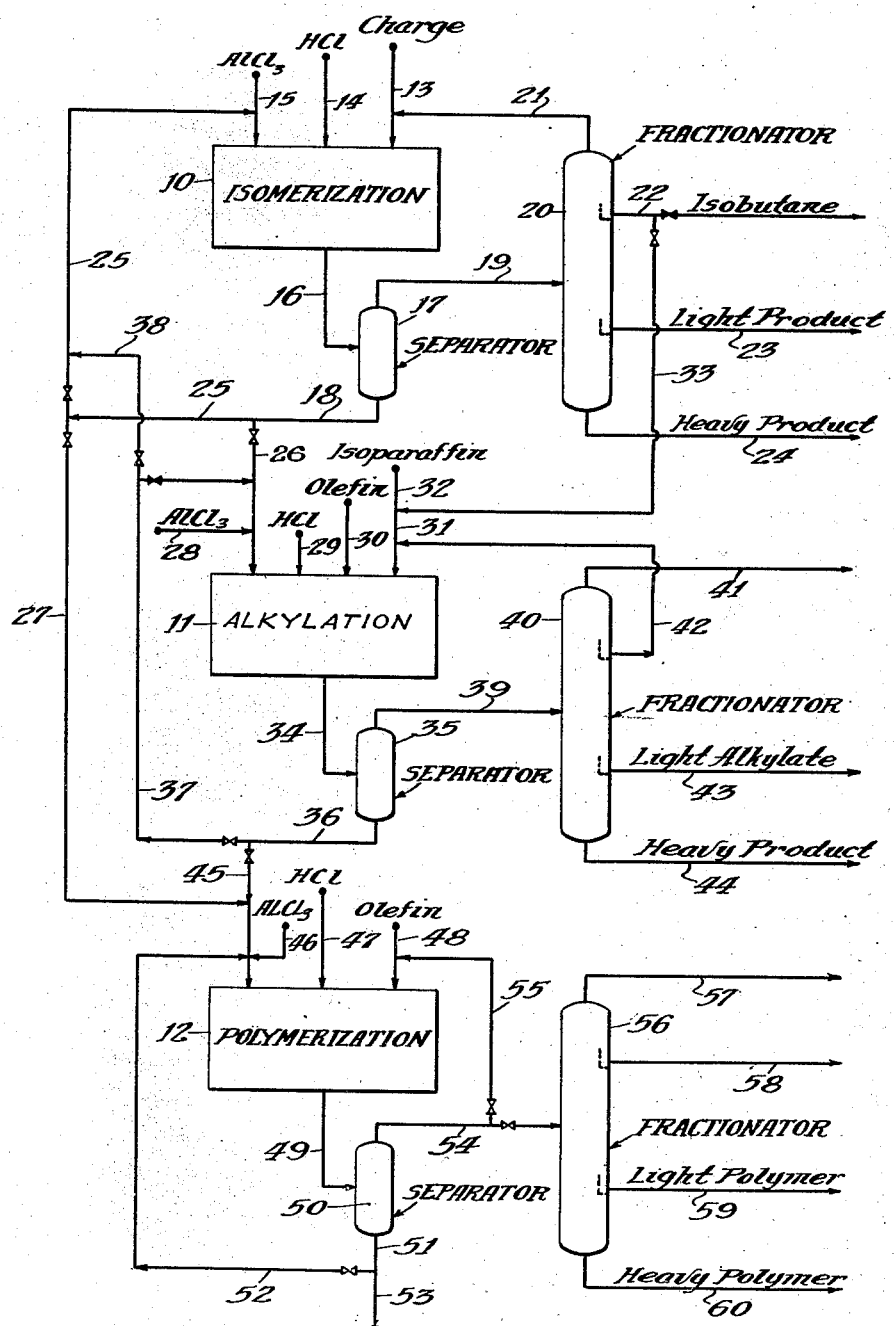

Sept. 17, 1946.  B. L. EVERING ET AL  2,407,873
POLYMERIZATION OF OLEFINS
Filed Nov. 13, 1943  2 Sheets-Sheet 2

Inventors:
Bernard L. Evering
Edmond L. d'Ouville
Don R. Carmody
By: Donald E. Payne
Attorney.

Patented Sept. 17, 1946

2,407,873

UNITED STATES PATENT OFFICE 2,407,873

POLYMERIZATION OF OLEFINS

Bernard L. Evering, Chicago, Ill., Edmond L. d'Ouville, Pittsburgh, Pa., and Don R. Carmody, Newton, Iowa, assignors to Standard Oil Company, Chicago, Ill., a corporation of Indiana Application November 13, 1943, Serial No. 510,112

11 Claims. (Cl. 260—683.15)

This invention relates to the polymerization of olefins and particularly normally gaseous olefins such as butenes by means of a liquid aluminum halide-hydrocarbon complex catalyst and it pertains more particularly to a particular catalyst employed and the method of preparing, fortifying and using said catalyst. This application is a continuation-in-part of our copending application Serial No. 287,089, now Patent No. 2,354,652, issued August 1, 1944.

When hydrocarbons are isomerized by means of aluminum halides such as aluminum chloride and aluminum bromide in the presence of hydrogen chloride a liquid aluminum halide-hydrocarbon complex is formed which itself is an active catalyst for promoting isomerization. After this catalyst is relatively spent for effecting isomerization it is still active for the alkylation or polymerization of olefins and even if the catalyst is relatively spent for alkylation of olefins with isoparaffins it is still relatively active for effecting olefin polymerization.

An object of this invention is to provide a process in which an aluminum chloride-hydrocarbon complex which is relatively spent in one reaction may be used as a catalyst in another reaction. A further object is to provide a method and means for effectively utilizing such complex until it is substantially completely spent. A further object is to provide an improved method and means of contacting olefins with an aluminum chloride-hydrocarbon complex for producing viscous hydrocarbons of high molecular weight. Other objects will become apparent as the detailed description of the invention proceeds.

It has long been known that olefins could be polymerized with aluminum chloride (U. S. 1,385,620) and it has been proposed that such polymerization be effected by means of a suspension of anhydrous aluminum chloride in petroleum ether (U. S. 1,745,028). When anhydrous aluminum chloride is thus employed for effecting polymerization a complex is formed with the olefin and it has been suggested that this complex itself acts as a polymerization catalyst by absorbing the olefin. In such cases it was deemed necessary to hydrolyze the resulting liquid in order to obtain the desired polymer. Our invention is an improvement over these known processes.

The aluminum chloride-hydrocarbon complex of our invention is preferably initially prepared by reaction of aluminum chloride with a saturated hydrocarbon instead of an olefin and the saturated hydrocarbon is preferably substantially free from aromatics. By employing a saturated hydrocarbon for making the complex we effectively limit the hydrocarbon content thereof. In other words, when a complex is prepared by continuously adding an olefin, this olefin is continuously absorbed or combined in the complex until the aluminum chloride content thereof reaches extremely small proportions. We have found that the aluminum chloride content of the complex should be upwards of 50% and should preferably be within the approximate range of 60 to 80%. A complex prepared from an aromatic-free distillate from a Mid-Continent crude and anhydrous aluminum chloride may for example have approximately the following analysis:

| | Weight per cent |
|---|---|
| Aluminum | 12.5 |
| Chlorine | 44 |
| Hydrocarbon | 43.5 |

In an effort to ascertain the chemical structure of the complex a portion of it was carefully decomposed by adding water drop by drop with constant stirring. The products were collected in a water reflux condenser, a solid carbon dioxide-acetone tower, a gas absorption tube to remove hydrogen chloride, and a permanent gas collector. The hydrocarbon layer was extracted with ether and the ether distilled from the hydrocarbon layer. The 45 volume percent overhead from the distillation of the hydrocarbons had the following characteristics:

Boiling range _____ 142°–553° F.
Refractive index _____ $N^{20}_D$ 1.3820–1.5377

The distillation revealed plateaus at 300° F. and again at 440° F., which fractions were characterized by pronounced terpene odors. The fraction showed varying degrees of unsaturation.

The activity of the aluminum chloride-hydrocarbon complex is dependent upon the nature of the bound hydrocarbon as well as the amount thereof. Complexes of little or no catalytic activity yield on hydrolysis a coke-like hydrogen-deficient organic material which is often insoluble in organic solvents. Active complexes on the other hand yield on hydrolysis a hydrocarbon of the lubricating oil viscosity range, e. g. with a molecular weight of about 300 to 500 and with an average of more than 1 double bond, generally 2 to 3 double bonds per molecule. For a catalytically active complex it is important that the hydrocarbon constituent which is liberated on hydrolysis have a certain minimum hydrogen-to-carbon ratio in relation to the total aluminum chloride content of the complex. There should be no less than 1.0 mol of aluminum chloride for each double bond in the hydrocarbon obtained on hydrolysis. Catalysts which contain about 2 mols of aluminum chloride per double bond are very suitable for polymerization. Catalysts have been used for isomerization in which the aluminum chloride ratio was as high as 10 mols of aluminum chloride per double bond in the oil produced on hydrolysis. Our preferred catalyst is one which contains from 1.0 to 5 mols of aluminum chloride per double bond in the oil which results from the hydrolysis of the complex. The number of double bonds can be determined by hydrogenation or other methods.

Our active complex catalyst is a rather viscous liquid having a specific gravity in the general vicinity of 1.5 and it is not appreciably soluble in hydrocarbons. When a hydrocarbon charging stock is introduced at the base of a column of such complex under sufficient pressure to maintain substantially liquid phase conditions the hydrocarbon becomes intimately dispersed in the column of complex so that the presence of a second phase is not readily discernible. On continued introduction, however, we have found that a clear hydrocarbon liquid separates from the top of a complex column as a separate and distinct phase. This product liquid may mechanically entrain some of the complex but entrained material may be separated out in a settler and returned to the column or adsorbed on a coke filter. For effective conversion the column should be at least 5 feet in height and should preferably be 10 to 30 feet in height. By using a column of complex of proper activity and height the losses of aluminum chloride by solution in the effluent product stream is substantially eliminated. We prefer to avoid the introduction of solid aluminum chloride per se into the column but any small amount of aluminum chloride which may reach the column as make-up catalyst is quickly taken up by the complex and thus utilized in maintaining the aluminum chloride content of the complex at the desired level.

Olefin-containing gases from any suitable source may be employed in our process. These may be gaseous olefins containing 2, 3 or 4 carbon atoms per molecule or a mixture of any two or more of such olefins. Also, we may use the dimers, trimers and higher polymers as charging stock for the polymerization. Dilution with paraffinic hydrocarbons is not objectionable and in fact is highly beneficial in that such saturated hydrocarbons serve to dilute the polymerization products and thus make possible the continuous removal of polymerization product from catalyst complex. A feature of our invention is the facility with which olefins may be polymerized from conventional refinery streams of $C_3$ or $C_4$ hydrocarbons such, for example, as streams containing normal and isobutane, butene-1, butene-2 and isobutylene or streams containing propane and propylene or mixtures of said streams. By regulating the polymerization conditions we may obtain polymers of the gasoline boiling range, polymers of the lubricating oil range or even heavier polymers.

Another feature of our invention is the multiple use of our improved catalyst complex. It may first be employed for the cracking, disproportionation or isomerization of saturated hydrocarbons, this step being an ideal method of preparing the complex in the first place from aluminum chloride. The complex may then be employed either for promoting alkylation of the isoparaffins produced in the isomerization step with an extraneous olefin or for effecting polymerization of extraneous olefins. By initially preparing the complex in the substantial absence of olefins we avoid the danger of employing a complex having an excessive hydrocarbon content and assure the production of the most suitable type of complex for effecting polymerization. Once the complex is formed its activity may be maintained by merely supplying make-up aluminum chloride, preferably to a portion of the complex which is withdrawn from the system and before that complex is returned to the system or charged to a subsequent conversion zone. The complex from the isomerization system may be employed for alkylation and then for polymerization or if desired the complex may be sent directly from the isomerization to the polymerization system.

Figure 2:
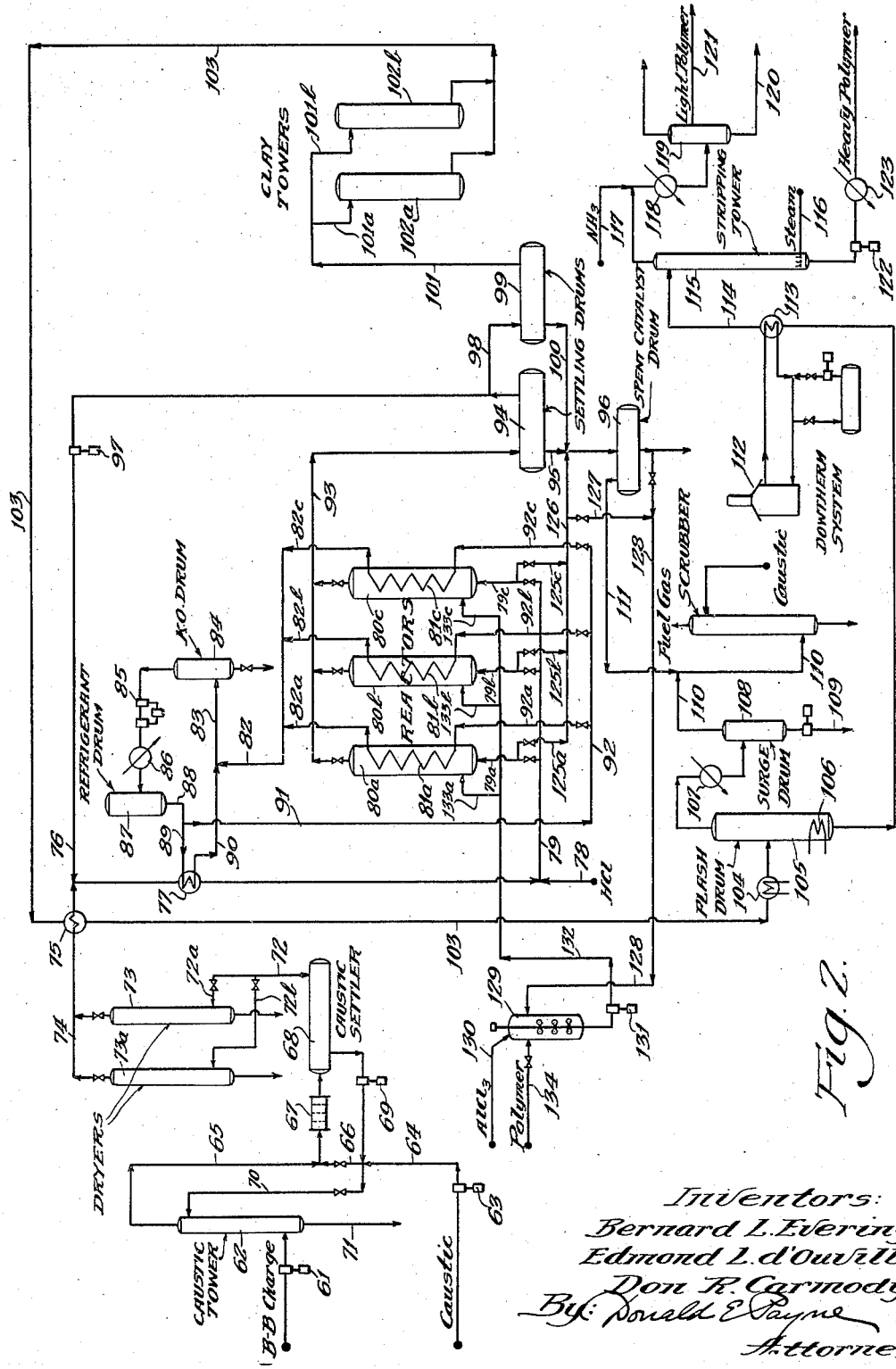

Our invention will be more clearly understood from the following detailed description read in conjunction with the accompanying drawings which form a part of this specification and in which Figure 1 is a schematic flow diagram illustrating the integration of the polymerization process with isomerization and/or alkylation, and Figure 2 is a flow diagram illustrating a commercial application of our polymerization process per se.

Referring to Figure 1, isomerization is effected in system 10, alkylation in system 11 and polymerization in system 12. The charging stock for the isomerization may be normal butane, normal pentane, hexanes, heptanes, octanes or a light paraffinic naphtha, preferably a straight-run naphtha having an end point not substantially higher than about 150 to 160° F. Such charge is introduced to the isomerization system through line 13, hydrogen chloride is introduced through line 14 and aluminum chloride through line 15. The aluminum chloride and hydrogen chloride react with a portion of the charge to form the complex as hereinabove described and this complex then effects conversion of the remainder of the charge at temperatures of about 100° F. to 250° F. or higher and at pressures from about 100 pounds per square inch to 1000 pounds per square inch, for example, about 450 pounds per square inch, the pressure preferably being sufficient to maintain the reactants in liquid phase conversion conditions. The contact time may range from about 1 to 120 minutes depending upon the other conditions of the reaction. As the reaction progresses a liquid complex is continuously formed. This complex is withdrawn with the hydrocarbons through line 16 to separator 17. In separator 17 the liquid complex settles out and is withdrawn through line 18. The isomerization reactor may be of the type illustrated in our copending application but it is preferably a tower-type reactor wherein the hydrocarbons pass as a dispersed phase upwardly through a column of complex and where make-up aluminum chloride is continuously introduced into this column either as a solution in a part of the incoming charge or in admixture with recycled complex.

The products from separator 17 pass through line 19 to a stripping and fractionation system 20 from which hydrogen chloride may be returned by line 21 to the isomerization system. A light isomerization product such as isobutane may be withdrawn through line 22 and a further light product may be withdrawn through line 23 and a heavy product through line 24. This fractionation system forms no part of our present invention and therefore requires no detailed description but it should be understood that such system includes separation and recovery of hydrogen chloride and the various hydrocarbon components which are discharged from separator 17.

A part of the complex leaving the bottom of separator 17 through line 18 may be recycled through line 25 to the isomerization system, a part or all of it may be introduced through line 26 into alkylation system 11 and a part or all of it may be introduced through line 27 to polymerization system 12. Into the alkylation system we may also introduce make-up aluminum chloride through line 28, hydrogen chloride through line 29, an olefin or aromatic hydrocarbon through line 30 and an isoparaffin hydrocarbon through line 31. The isoparaffin may come from an external source 32 or from the isomerization system through line 33. The alkylation reaction may be effected at temperatures from about 0 to 212° F. depending on the olefins used, and under pressures from about 0 to about 1000 pounds per square inch gauge. The isoparaffinic hydrocarbons should be present in amounts equal to and preferably in excess of the olefinic hydrocarbons. The ratio of isoparaffin to olefin charged (external ratio) may vary from about 1:1 to 6:1 or more. Intimate contact between the aluminum chloride-hydrocarbon complex and the hydrocarbon feed stocks may be obtained by rapid stirring or by mixers or circulating systems or by tower-type reactors. Examples for more specific operating conditions are set forth in United States Patents 2,308,560-1-2.

The reaction mixture is withdrawn from alkylation system 11 through line 34 to separator 35 wherein the complex is separated from hydrocarbons. If the catalyst is not spent with regard to alkylation it may be withdrawn through line 36 and at least a part of it may be recycled through line 37 to the alkylation system. It is possible to restore a part of the activity of the complex by addition of aluminum chloride and it is thus possible to use complex from separator 35 in isomerization chamber 10 by returning it through line 38 and line 25.

The hydrocarbon product of the alkylation reaction is withdrawn from separator 35 through line 39 to fractionation system 40 from which material lighter than isobutane may be removed through line 41, isobutane for recycling may be withdrawn through line 42, a light alkylate may be withdrawn through line 43 and a heavy product through line 44. It should be understood that any type of stripping, fractionation and recovery system may be employed.

The catalyst from the alkylation reaction may no longer be effective for promoting the reaction between olefin and isoparaffin and yet may not be spent as regards further catalyst activity. For this reason a part or all of it may be withdrawn from separator 35, line 36 and line 45 to polymerization system 12 wherein olefins are polymerized to form hydrocarbons suitable for use as gasoline or as lubricating oil depending upon the conditions maintained in the polymerizer. The complex withdrawn from separator 35 may contain slightly more or slightly less bound hydrocarbon than the catalyst withdrawn from separator 17 but generally speaking complexes from these sources are quite similar in composition and activity. Although these complexes may be relatively spent for the isomerization and alkylation reactions they are still highly effective for effecting olefin polymerization.

The catalyst complex introduced into polymerizer 12 through line 45 may be fortified by aluminum chloride introduced through line 46, such amount of aluminum chloride being employed that the resulting complex will have an aluminum chloride content of about 40 to 80%, generally about 50%. Usually the complex will contain sufficient hydrogen chloride for polymerization reaction. Any additional small amounts of hydrogen chloride may be introduced through line 47. An olefin charging stock is introduced through line 48. This olefin charging stock is preferably a refinery gas stream rich in isobutylene and normal butenes but also containing considerable amounts of corresponding paraffin hydrocarbons, i. e. butane and isobutane. Alternatively, the charge may consist essentially of a mixture of propane and propylene or it may consist of a mixture of hydrocarbons of from 2 to 5 carbon atoms at least a substantial portion of which is olefins. In the specific example hereinafter set forth the olefin charge consists of a butane-butylene stream containing about 15% isobutylene, 25% normal butenes, 55% butanes and the remainder $C_3$ and $C_5$ hydrocarbons.

The conditions in polymerizer 12 may be varied depending upon the type of olefin charged and the products desired. In the polymerization of these gaseous olefins to gasoline type or lubricating oil type fractions we may use temperatures of about 0° to 450° F. and pressures sufficient to keep the reactants in liquid phase. Predominantly gasoline type fractions may be produced at the higher temperatures and heavier lubricating oil fractions will predominate in the product when the lower temperatures are used. For heavy products the polymerization may range from 40° to 0° F. or even lower, but for our purposes the best temperatures are in the general vicinity of about 20° to 30° F. Intimate contact between the olefinic feed gas and the catalyst may be obtained by the use of mechanical stirrers or circulating systems but remarkably superior results are obtainable by the use of a simple tower type reactor as will be hereinafter described in more detail. The temperature may be maintained by the use of suitable cooling coils.

The aluminum chloride complex and the polymerized hydrocarbons may be withdrawn through line 49 to separator 50 from which complex may be withdrawn through line 51 and either recycled through line 52 or be withdrawn from the system through line 53, a part usually being recycled for further fortification for use with aluminum chloride and another part being withdrawn.

The polymerized hydrocarbons are withdrawn from the separator through line 54 and a part of them may be recycled through line 55 to the polymerization reactor or system 12. The remainder may be introduced into a fractionation system 56 from which unreacted light gases are withdrawn through line 57, low boiling liquids through line 58, light polymer through line 59 and heavy polymer through line 60. Here again it will be understood that any type of fractionation stripping and product recovery means may be used. If the fraction withdrawn through line 58 consists essentially of isobutane this fraction may be introduced to alkylation zone 11 through line 31 and if it is predominantly normal butane it may be charged to isomerization system 10 through line 13. Other methods of utilizing various products will be apparent to those skilled in the art from the above description.

An outstanding feature of our integrated process as herein described is the multiple use of our specific type of improved aluminum chloride-hydrocarbon complex. This complex is preferably initially prepared by a reaction such as isomerization which involves a saturated hydrocarbon so that the resulting complex will contain not more than 50% and preferably only about 20 to 45% of bound hydrocarbon. This bound hydrocarbon, while derived from saturated hydrocarbons, is unsaturated in character. The character of the bound hydrocarbons from the isomerization or alkylation complex should be such that on hydrolysis of the complex it will yield a viscous oil of about 300 to 500 molecular weight which is characterized by limited unsaturation, our preferred catalyst for polymerization containing about 2 mols of aluminum chloride per double bond in the oil which results from complex hydrolysis.

The activity of our complex may be measured by its heat of hydrolysis. In the case of aluminum chloride complexes the activity for isomerization or alkylation should be within the approximate limits of 60 to 75 large calories per gram atom of active aluminum; for polymerization the activity should be within the approximate limits of 50 to 67 large calories per gram atom of active aluminum. In the case of aluminum bromide complexes the activity should be within the approximate limits of 67 to 82 large calories per gram atom of active aluminum for isomerization or alkylation and within the approximate limits of 57 to 75 large calories per gram atom of active aluminum in the case of polymerization. The expression "active aluminum" means the aluminum content of the hydrolizable aluminum compound in the liquid complex material; inactive aluminum compounds such as oxides or hydroxides are thus not included by the expression "active aluminum."

Since our invention is primarily concerned with olefin polymerization we will now describe an example of a commercial application of the invention in a plant for producing 800,000 gallons per year of a butene polymer having a viscosity of the order of 700 to 1800 seconds Saybolt universal viscosity at 210° F. The charge in this case is a refinery butane-butylene stream of approximately the following composition:

|  | Mol per cent | Volume per cent |
|---|---|---|
| Propylene | 0.1 | 0.1 |
| Propane | 0.7 | 0.7 |
| Isobutane | 46.7 | 47.2 |
| Butylenes | 41.2 | 40.3 |
| Normal butane | 8.9 | 8.8 |
| Pentanes | 1.7 | 2.0 |
| Amylenes | 0.7 | 0.9 |

Of the butylenes about 36% is isobutylene, 26% butene-1 and 38% butene-2. About 685 barrels per day (about 1200 gallons per hour) of this charging stock is introduced by pump 61 at about 260 pounds pressure into caustic tower 62 which may be about 2½ feet in diameter by about 12 feet high. 41 barrels per day of 10% aqueous sodium hydroxide is introduced by pump 63 to line 64. The overhead stream leaves tank 62 through line 65, is admixed with caustic from line 66, passed through mixer 67 and introduced into caustic settler 68. The settled caustic is returned by pump 69 either through line 66 to mixer 67 or through line 70 to the top of tower 62. Spent caustic is removed from the system through line 71.

The neutralized butane-butylene stream then passes by lines 72 and 72a or 72b into one or both of the calcium chloride dryers 73 and 73a. The dried stream leaves the top of the dryers through line 74 at a pressure a little over 200 pounds per square inch and passes through heat exchanger 75 wherein it is cooled from about 100° F. to about 70° F. The stream is then joined by recycled product stream from line 76 which brings the resulting temperature down to about 40° F. The mixture next passes through cooler 77 which lowers the temperature of the stream to about 0° F. About 0.86 pound per hour of anhydrous hydrogen chloride is then introduced to the stream through line 78 and the stream is introduced through branch line 79a, 79b and/or line 79c into polymerization towers 80a, 80b, and/or 80c, respectively. Each of these towers is about 4½ feet in diameter by about 12½ feet in height and each is provided with cooling coils 81a, 81b and 81c for removing 103,000 B. t. u. per hour. The cooling is effected by vaporization of propane or other suitable refrigerant within the cooling coils, the refrigerant vapors being returned by lines 82, 82a, 82b and 82c and line 83 to knock-out drum 84, then to compressor 85, condenser 86 and refrigerant holding drum 87. A part of the refrigerant from the holding drum passes by lines 88 and 89 through cooler 77 and thence by lines 90 and 83 to knock-out drum 84. The remainder of the refrigerant passes by line 91 and lines 92a, 92b and 92c to inlet ends of coils 81a, 81b and 81c.

Before initiating the polymerization each of the reactors is charged with an aluminum chloride-hydrocarbon complex which has preferably been prepared by reaction of aluminum chloride with a saturated light hydrocarbon in the presence of hydrogen chloride as hereinabove described so that said complex will have a hydrocarbon content of about 20 to 60%. A heat of hydrolysis within the approximate range of 50 to 67 large calories per gram atom of active aluminum will on hydrolysis yield an oil of about 300 to 500 molecular weight there being about 1 to 5 mols of aluminum in the complex per double bond of the oil thus produced on hydrolysis. The complex can be prepared from the butane-butylene charge itself provided that proportions and complex-forming conditions are employed to insure a complex of the above characteristics but we prefer to prepare the initial complex by treating pentane, light naphtha or similar hydrocarbons with aluminum chloride in the presence of hydrogen chloride.

Each reactor is about one-half filled with such complex and the charging stock is dispersed into the base of the complex by suitable distributors so that the charging stock passes upwardly as a dispersed phase in the column of complex. The temperature in the reactors is maintained within the relatively narrow limits of about 20 to 30° F. although this temperature may be as high as 40° F. if larger amounts or lower viscosity products may be tolerated and may be lower than 20° F. if heavier products are desired. The feed inlet temperature may be approximately the same as the average reactor temperature, the pressure should be sufficient to maintain liquid phase conversion conditions and may be of the order of 100 to 500, for example 185 pounds per square inch. The space velocity may be of the order of about 0.1 to 10, for example 2 volumes of inlet stream (including recycled material) per volume of complex in the reactor per hour. Relatively low space velocities (.1 to 2) may be necessary with relatively inactive catalyst, and relatively high space velocities (2-10) with catalyst of high activity, assuming a column height of about 5 to 20 feet. An amazing feature of this system is the remarkably effective conversion which is effected without any mechanical mixers, stirrers or circulators the charging stock and diluted products being lighter than the complex passes upwardly therethrough and leave the top of the reactors through line 93 to settling tank 94. This tank may be maintained at a pressure of about 175 pounds per square inch and a temperature of about 30° F. The complex which settles out in this tank is withdrawn through line 95 to catalyst storage drum 96. About 2500 barrels per day of the product leaving the top of tank 94 is recycled through line 76 by means of pump 97 for admixture with the incoming stream as hereinabove described. The remainder of the product stream passes through line 98 to settling drum 99 from which additional catalyst is separated and returned through line 100 to storage drum 96. The product stream next passes through lines 101 and 101a or 101b to clay towers 102a and 102b which operate at pressures of about 165 pounds per square inch. The products leaving the clay towers through line 103 pass through heat exchanger 75 wherein they are heated to about 70° F. and then passed through heater 104 wherein they are heated to about 270° F. at which temperature they are introduced into flash drum 105 which operates at about 135 pounds per square inch. This tower is provided with a heater 106 for maintaining a tower bottom temperature of about 335° F. The overhead which leaves the tower at about 300° F. is cooled in cooler 107 and introduced into butane surge drum 108 at about 100° F. About 543 barrels per day of butanes with residual butenes are introduced from the base of this surge drum through line 109 to an alkylation system. Any gases purged from the top of the surge drum through line 110 may be combined with gases discharged from the top of catalyst storage drum 96 through line 111, scrubbed with spent caustic and then introduced into a fuel gas line.

The bottoms from flash drum 105 are heated preferably in a Dowtherm system a diphenyl or diphenyl oxide being heated in furnace 112 to a temperature of about 500° and then passed through exchanger 113 and returned to the furnace at approximately the same temperature. The stream which passes through exchanger 113 is then heated to about 500° F. which steam is introduced through line 114 to stripping tower 115 which may be about 2 feet in diameter to about 24 feet in height, which may operate at about 5 pounds per square inch gauge with a bottom temperature of about 450° F. and a top temperature of about 500° F. 152 pounds per hour of 110 pounds steam is introduced at the base of this stripper through line 116. To the overhead from the stripper about .4 pound per hour of ammonia is added through line 117 and the overhead stream then passes through cooler 118 to separating drum 119 from the bottom of which water is withdrawn through line 120 and from the side of which a light polymer stream is withdrawn through line 121. This light polymer stream may amount to about 35 to 40 barrels per stream day and is characterized by a Saybolt viscosity of about 50 seconds Saybolt at 100° F., an A. P. I. gravity of about 43 and a flash of 130° F.

The heavy polymer which is withdrawn from the base of the tower at the rate of about 60 to 65 barrels per stream day is forced by pump 122 to cooler 123 and thence to storage. This heavy polymer has the following characteristics:

Viscosity_____ 900 sec. Saybolt at 210° F.
Gravity A. P. I._____ 29
Pour_____ +35° F.
Flash_____ 350–400° F.

To maintain the catalyst at the desired activity in this process complex from storage tank 96 or complex withdrawn from the reactors through lines 125a, 125b, 125c, lines 126 and 127 is introduced through line 128 to fortification tank 129 into which powdered aluminum chloride is added from source 130. The added aluminum chloride is intimately mixed with the complex so that the aluminum chloride content thereof will be increased to such an extent that when this fortified complex is returned to the polymerization reactors it will maintain the aluminum chloride content of the complex in said reactors within the desired range of about 40 to 80% or preferably about 45 to 55%. About 2 to 10, for example about 6 pounds of aluminum chloride is usually required per barrel of total polymer produced. In this particular case about 25 pounds per hour of aluminum chloride is introduced into the fortifying chamber along with an equal or greater amount of complex and the resulting mixture in the form of a viscous complex or paste is introduced by pump 131, line 132 and branch lines 133a, 133b and 133c to reactors 80a, 80b and 80c respectively. Instead of adding the make-up aluminum chloride in fortified complex it may be added by making new complex with substantially equal amounts of aluminum chloride and polymer (such as heavy polymer produced in our process) the latter being introduced through line 134. By simply fortifying the complex, however, we not only minimize the necessary amount of added aluminum chloride but we obtain better control.

It should be noted that aluminum chloride per se is not the effective catalyst in our polymerization reactor and we prefer to avoid any introduction of solid aluminum chloride into the reactors, the make-up being added in the form of fortified complex which in turn equalizes with the complex in the columns of catalyst in the reactors. Should any small amounts of entrained or uncombined aluminum chloride actually enter the reactor it quickly becomes associated with the complex therein. The remarkable advantages offered by our system are due in large measure to the use of our particular catalyst complex as distinguished from the use of solid aluminum chloride. In other words, we obtain a control of reaction and product produced which would be impossible in the case of solid aluminum chloride catalysts, wherein such difficulties as hot spots, dead spots, channeling, plugging, etc. are always encountered. Another feature of our invention is the use of a relatively stationary column of liquid complex in the reactor, the passage of dispersed charging stock continuously therethrough, and the maintenance of substantially constant complex activity by carefully controlling rates of adding make-up and withdrawing relatively spent complex.

The nature of the conversion and of the produced products can be controlled by regulating the space velocity, the height of the column of complex and the activity of the complex to obtain any desired extent of olefin clean-up. By using a relatively high column and/or a sufficiently low space velocity the olefin clean-up may be almost quantitative with a relatively active complex. By using higher space velocities and relatively short column of complex, particularly with relatively inactive complex, the olefin clean-up may be relatively small and the polymerization will be relatively selective, i. e., will be largely limited to the polymerization of isobutylene. The following table will illustrate how the polymerization and the nature of polymerized products vary with different percentages of olefin clean-up in the case of specific olefinic gas hereinabove described wherein there are about 2 parts of normal butenes to about 1 part of isobutenes and where the complex contains in the general vicinity of 50% by weight of bound hydrocarbon.

*Selective polymerization of isobutylene*

| Per cent clean-up of olefins | Per cent of i-$C_4$= reacting | Per cent of n-$C_4$= reacting | Weight per cent i-$C_4$= polymer | Weight per cent n-$C_4$= polymer |
|---|---|---|---|---|
| 20 | 44 | 7 | 78 | 22 |
| 40 | 69 | 24 | 62 | 38 |
| 60 | 88 | 44 | 52 | 48 |
| 80 | 97 | 71 | 44 | 56 |

The heavy polymer which may have a viscosity range from 700 to 1800 seconds Saybolt at 210° F. is extremely valuable for a large number of special applications. It is a particularly valuable component of specialty or premium lubricants and coating compositions. It is likewise valuable for the preparation of lubricant addition agents which may be prepared by treating said polymer with oxygen, sulfur, chlorine, phosphorous, etc. or compounds thereof.

The light polymer likewise has valuable properties which cannot be duplicated by natural petroleum oils and for example a fraction having the following specifications is outstandingly superior as an ice machine oil, air compressor lubricant and a variety of other uses.

| | |
|---|---|
| Viscosity at 100° F | 7.5–9 centistokes |
| Pour °F | −85 max. |
| Carbon residue | 0.01 max. |
| Color, NPA | 2 max. |
| Neutralization No., mg. KOH/gm | 0.05 max. |
| Flash, °F | 180 min. |
| Dielectric strength | 25,000 max. |

A remarkable and unpredictable advantage offered by our polymerization process is the large yield of polymer obtainable from a given amount of catalyst. Based on fresh feed the aluminum chloride requirements are only about 1% by weight and the hydrogen chloride requirements are only about .01% by weight or less. We may obtain upwards of 20 gallons of polymer per pound of aluminum chloride with our process while processes employing solid aluminum chloride as a catalyst produces only about 2 to 3 gallons of polymer per pound of aluminum chloride. Furthermore, our process is remarkably simple in operation and is free from most of the troublesome operating difficulties which inevitably arise from the use of solid aluminum chloride catalyst.

While we have described in considerable detail a specific example of our invention it should be understood that this example is by way of illustration and not by way of limitation. Various modifications of apparatus and alternative operating conditions will be apparent from the above detailed description to those skilled in the art.

We claim:

1. The method of utilizing aluminum chloride in catalytic hydrocarbon reactions which comprises first contacting it with a substantially aromatic-free normally liquid saturated hydrocarbon fraction under conditions for effecting isomerization of said hydrocarbon fraction and the formation of an aluminum chloride complex which on hydrolysis would yield a hydrocarbon oil of lubricating oil viscosity and which complex contains from about 1 to 5 mols of aluminum chloride per double bond in the oil which would result from said hydrolysis, separating said aluminum chloride complex from isomerized hydrocarbons, and subsequently treating normally gaseous olefins in the presence of said aluminum chloride complex under conditions for effecting polymerization of said gaseous olefins.

2. The method of converting normally gaseous olefinic hydrocarbons to hydrocarbons of higher molecular weight which comprises contacting said olefinic hydrocarbons under conditions for effecting polymerization with an aluminum chloride complex originally formed during the isomerization of normally liquid saturated hydrocarbons by contact with an aluminum chloride catalyst under isomerization conditions, said complex being one which on hydrolysis would yield a hydrocarbon oil of lubricating oil viscosity and which contains from about 1 to 5 mols of aluminum chloride per double bond in the oil which would result from said hydrolysis.

3. The method of utilizing aluminum chloride in hydrocarbon conversion processes which method comprises treating paraffinic hydrocarbons with an aluminum chloride catalyst in the presence of hydrogen chloride to effect an isomerization reaction and to produce a complex of lowered activity for the isomerization reaction, said complex being one which on hydrolysis would yield a hydrocarbon oil of lubricating oil viscosity and which contains from about 1 to 5 mols of aluminum chloride per double bond in the oil which would result from said hydrolysis, and subsequently contacting said catalyst of lowered isomerization activity with a hydrocarbon stream consisting substantially entirely of normally gaseous hydrocarbons containing olefins under conditions for effecting the production therefrom of normally liquid hydrocarbons of branched-chain structure.

4. The method of utilizing aluminum chloride in catalytic hydrocarbon reactions which comprises first contacting it with a substantially aromatic free normally liquid saturated hydrocarbon fraction under conditions for effecting isomerization of said hydrocarbon fraction and the formation of an aluminum chloride complex, separating said aluminum chloride complex from isomerized hydrocarbons, subsequently treating a mixture of isoparaffins with olefins in the presence of said aluminum chloride complex under conditions for effecting alkylation, and contacting olefinic hydrocarbons with a substantially spent catalyst from the alkylation system under conditions for effecting polymerization of said olefinic hydrocarbons.

5. The method of polymerizing normally gaseous olefins which comprises continuously passing said olefins upwardly in the liquid phase through a column at least five feet in height of catalytically active liquid aluminum chloride aliphatic hydrocarbon complex in a polymerization zone, said complex being immiscible with hydrocarbons and polymer products and having an aluminum chloride content in the range of about 40% to about 80% by weight and at least one mol $AlCl_3$ per double bond in the oil which results from hydrolysis of said complex, continuously introducing with said olefins a substantial amount of liquefied normally gaseous paraffin hydrocarbons for lowering the viscosity and density of polymerization products by dilution and thus facilitating their separation from the heavier complex in which hydrocarbons are substantially insoluble, maintaining the column at substantially constant polymerization temperature by precooling the introduced hydrocarbons to a temperature below the polymerization temperature and by abstracting heat from the column by indirect heat exchange with a coolant circulated through the polymerization zone, continuously separating diluted products from complex in the upper part of the polymerization zone, continuously removing separated diluted products from the upper part of the polymerization zone at a point spaced from the column of complex whereby the bulk of the complex is retained in the polymerization zone and employing a space velocity, column height and complex activity in the polymerization zone for effecting an olefin clean-up within the range of about 40% to at least about 80%.

6. The method of producing polymers of lubricating oil viscosity from olefins higher boiling than ethylene and lower boiling than amylene which method comprises treating a refinery gas stream consisting essentially of paraffins and olefins higher boiling than ethane and lower boiling than pentane to remove other components therefrom, combining said treated stream with a recycled stream hereinafter defined, cooling said combined stream to a temperature below the temperature employed for effecting polymerization, introducing the cooled stream at the base of a polymerization zone containing a column at least about five feet in height of active liquid aluminum chloride-aliphatic hydrocarbon complex, said complex being substantially immiscible with hydrocarbons and polymer products and containing in its composition an amount of hydrocarbon constituents within the approximate range of about 20% to about 60% by weight, said complex being further characterized by containing at least one mol $AlCl_3$ per double bond in the oil which results from hydrolysis of said complex, dispersing the cooled stream at the base of said column and passing said stream upwardly as a dispersed liquid phase through said column, removing heat from said column by indirect heat exchange of complex in the column with a coolant circulated therethrough and effecting said heat removal at a rate to maintain the column at a substantially constant polymerization temperature, maintaining a pressure in the polymerization zone sufficient to maintain the hydrocarbons in liquid phase, employing a space velocity in the range of about .1 to 10 and sufficient to obtain an olefin clean-up of at least about 40%, separating products diluted with unreacted normally gaseous paraffins from the bulk of the complex in the polymerization zone and continuously withdrawing a diluted polymer product stream from the upper part of the polymerization zone at a point spaced from the top of the column of complex therein, returning an aliquot portion of the withdrawn stream in substantial amounts as the recycle stream for admixture with the incoming refinery gas stream, treating another portion of the withdrawn stream to remove catalyst contaminants therefrom and fractionating said lastnamed portion of the product stream after the treating step.

7. The method of polymerizing normally gaseous olefins from a hydrocarbon stream containing said olefins in admixture with normally gaseous paraffin hydrocarbons which method comprises continuously distributing said stream in liquid phase at a low point in a column of active liquid aluminum chloride-aliphatic hydrocarbon complex, said complex being immiscible with hydrocarbons and polymer products, containing in its composition amounts of hydrocarbon constituents in the range of about 20% to about 60% by weight, being one which on hydrolysis would yield a hydrocarbon oil of lubricating oil viscosity and further characterized by having from about 1 to 5 mols of aluminum chloride per double bond in the oil which would result from said hydrolysis, passing said distributed stream upwardly through at least about 5 feet of said column of said complex under conditions for effecting polymerization as the main reaction, continuously removing heat from said column by passing a coolant in indirect heat exchange relationship therethrough, continuously separating polymerization products diluted with unreacted paraffin hydrocarbons from the bulk of the complex in the upper part of the polymerization zone, continuously withdrawing a stream of diluted products from the upper part of the polymerization zone at a point spaced from the top of the column of complex whereby the bulk of the complex is retained in the polymerization zone, treating a minor portion of the withdrawn product stream to remove any entrained catalyst material therefrom, fractionating the treated products to obtain at least one fraction of lubricating oil viscosity, and recycling a major portion of the withdrawn product stream prior to the treating step to said low point in said column of active complex in said polymerization zone.

8. The method of polymerizing olefins containing more than two and less than five carbon atoms per molecule from a liquefied gas stream consisting essentially of a mixture of said olefins with normally gaseous paraffin hydrocarbons containing more than two carbon atoms per molecule which method comprises cooling said liquefied stream to a temperature below the temperature employed for effecting polymerization, introducing the cooled stream at the base of a column at least five feet in height of an active liquid aluminum chloride-aliphatic hydrocarbon complex which has a hydrocarbon content in the range of about 20% to 60% by weight, which is immiscible with hydrocarbons and polymer products and which on hydrolysis would yield a hydrocarbon oil of lubricating oil viscosity and which contains about 1 to 5 mols of aluminum chloride per double bond in the oil which would result from hydrolysis, passing the introduced stream as a dispersed phase upwardly through said column of active liquid complex in a conversion zone under a pressure sufficient to maintain liquid phase conversion conditions and at a temperature and rate for effecting polymerization as the main reaction, removing heat from the column of complex by indirect heat exchange of complex in the column with a circulating coolant, separating liquid polymerization products diluted with said normally gaseous paraffinic hydrocarbons from the bulk of the complex material in the conversion zone, withdrawing a diluted liquid product stream from the upper part of the conversion zone to a settling zone, removing further amounts of complex from the diluted liquid product stream in said settling zone, treating at least a portion of the diluted liquid product stream from the settling zone to remove residual amounts of catalyst material and fractionating said treated portion of the product stream.

9. The method of claim 8 which includes the steps of separately withdrawing a major portion of the diluted product stream from the settling zone, cooling said major portion and recycling said major portion to the base of the column of active liquid aluminum chloride-hydrocarbon complex.

10. The method of obtaining viscous hydrocarbons from butylenes which method comprises cooling a liquefied dry butane-butylene stream containing substantial amounts of butanes, normal butylenes and isobutylene to a temperature below the temperature employed for effecting polymerization, contacting the cooled stream in a polymerization zone with a mass of active liquid aluminum chloride-aliphatic hydrocarbon complex, effecting said contacting by continuously dispersing said cooled stream at a low level in a column at least five feet in height of such active liquid complex which is immiscible with said stream and with the polymerized hydrocarbon product and which contains at least 20% but not more than 50% of hydrocarbon constituents in its composition, and at least one mol $AlCl_3$ per double bond in the oil which results from hydrolysis of said complex, passing said dispersed stream upwardly through said column under polymerization conditions which include a pressure sufficient to maintain the hydrocarbons in liquid phase, a polymerization temperature and a space velocity and column height sufficient to effect an olefin clean-up within the range of about 40% to at least about 80%, abstracting heat from said column by passing a coolant in indirect heat exchange relationship therethrough, continuously separating diluted polymer product from complex in the upper part of the polymerization zone, continuously withdrawing a stream of diluted polymer product from an upper point in the polymerization zone which is spaced from the column of complex, treating at least a portion of the withdrawn product stream to remove catalyst contaminants therefrom and fractionating said treated portion to obtain at least one viscous liquid fraction.

11. The method of claim 10 which includes the steps of recycling a major portion of the withdrawn product stream and returning it to the polymerization zone in admixture with the liquefied butane-butylene stream.

BERNARD L. EVERING.
EDMOND L. D'OUVILLE.
DON R. CARMODY.